United States Patent [19]

Morimoto

[11] Patent Number: 4,613,489
[45] Date of Patent: Sep. 23, 1986

[54] PROCESS FOR THE DISPROPORTIONATION OF CHLOROSILANES

[75] Inventor: Shiro Morimoto, Tokushima, Japan

[73] Assignee: Osaka Titanium Co., Ltd., Hyogo, Japan

[21] Appl. No.: 776,215

[22] Filed: Sep. 10, 1985

Related U.S. Application Data

[63] Continuation-in-part of Ser. No. 596,317, Apr. 3, 1984, abandoned.

[30] Foreign Application Priority Data

Aug. 10, 1983 [JP] Japan .............................. 58-147066

[51] Int. Cl.$^4$ .......................................... C01B 33/107
[52] U.S. Cl. .................................. 423/342; 423/341; 423/347
[58] Field of Search ........................ 423/341, 342, 347

[56] References Cited

U.S. PATENT DOCUMENTS

| | | | |
|---|---|---|---|
| 3,044,845 | 7/1962 | Jex et al. | 423/342 |
| 3,928,542 | 12/1975 | Bakay | 423/342 |
| 3,968,199 | 7/1976 | Bakay | 423/347 |
| 4,018,871 | 4/1977 | Marin et al. | 423/342 |
| 4,113,845 | 9/1978 | Litteral | 423/342 |
| 4,395,389 | 7/1983 | Seth | 423/341 |

Primary Examiner—William R. Dixon, Jr.
Assistant Examiner—Steven Capella
Attorney, Agent, or Firm—Laurence R. Brown

[57] ABSTRACT

The process of disproportionation of chlorosilanes in the presence of a dried catalyst which is dried by heating up to 200° C. under vacuum starting from a water-containing anion exchange cross-linked resin matrix containing as a functional group and said resin matrix stable at temperatures up to about 200° C. without separation of the functional group from the resin matrix to produce the disproportionated product of high purity, semiconductor grade, without any contamination from the catalyst.

3 Claims, 1 Drawing Figure

PROCESS FOR THE DISPROPORTIONATION OF CHLOROSILANES

RELATED APPLICATION

This application is a continuation in part of U.S. application Ser. No. 596,317 filed Apr. 3, 1984 abandoned.

TECHNICAL FIELD

This invention relates to an improved process for the disproportionation of chlorosilanes to produce the disproportionated products of high purity in a semiconductor grade without any contamination from the catalyst used.

BACKGROUND ART

Various processes have been proposed for the disproportionation of chlorosilanes to obtain silanes from which silicon of high purity can be produced. The known processes present a number of disadvantages from the standpoint of reaction rate, temperature, contamination, corrosion resistance and economy.

The known process of employing an ion exchange resin containing tertiary amino or quaternary ammonium groups as disclosed by Litteral in U.S. Pat. No. 4,113,845 uses a toluene process to dehydrate the resin bed. The copolymerization of a monounsaturated hydrocarbon, such as styrene, which is a monomer not containing any basic functional group, and a polyunsaturated hydrocarbon, such as divinylbenzene, and introducing as a basic functional group a tertiary amino or quaternary ammonium group which is bonded to the matrix through carbon, provide a basic ion exchange resin. The tertiary amino or quaternary ammonium group bonded to the aromatic nucleus through carbon can be eliminated from the aromatic nucleus as a small molecule such as trimethylamine. The elimination reaction can be promoted by heating and by catalytic action of silicon tetrachloride, trichlorosilane, dichlorosilane, or monochlorosilane. The formation of the small molecule gives always the contamination to the disproportionated products from the catalyst used. The separation of the functional group restricts the use of the catalyst to temperatures below 80° C. and the maximum yield to 8 mole percent of dichlorosilane in the reaction process. Additionally, the use of a safer and more economical means for drying the resin bed which requires temperature of greater than 50°-80° C. results in separation of the functional group of the catalyst which renders the catalyst ineffective.

BRIEF SUMMARY OF THE INVENTION

The disproportionation of trichlorosilane is effected by the following reaction:

$$2HSiCl_3 = H_2SiCl_2 + SiCl_4$$

The equilibrium constant of this reaction increases with a rise in temperature, as shown in Table 1. In order to achieve a high rate of conversion of chlorosilanes, therefore, it is desirable to have the reaction proceed at a high temperature.

TABLE 1

| Temperature (Degrees C.) | 40 | 60 | 80 | 100 | 150 | 200 |
|---|---|---|---|---|---|---|
| Equilibrium Constant | 1.70 | 2.14 | 2.37 | 2.90 | 4.03 | 5.23 |

TABLE 1-continued ($\times 10^{-2}$)

A catalyst such as an ion exchange resin of the macroporous type which is capable of withstanding a high temperature, and more specifically, an anion exchange resin of the macroporous type containing as a functional group an aromatic heterocyclic base which is contained in a cross-linking high molecular matrix, provides a process which enables the disproportionation of chlorosilanes at a high temperature to produce the disproportionated product of high purity in a semiconductor grade without any contamination from the catalyst and allows for a drying process for the resin bed that is safer and more economical. The claimed invention provides an increase in yield of dichlorosilane in the reaction product of high purity semiconductor grade and alleviates the need to interrupt production to replace spent catalyst and introduce new catalyst.

An anion exchange resin which utilizes an anion exchange resin having the functional group introduced to the macro-structure is very likely to have its functional group separated therefrom and give contamination to the reaction product at temperatures of higher than 80° C., for example at 100° C. Under the circumstances, the maximum yield of dichlorosilane is 8 mole percent. Once the functional group is separated from the resin matrix, the catalyst is inoperable and unusable for the disproportionation of chlorosilanes. To achieve a high rate of conversion, a high temperature is necessary.

It is, therefore, an object of this invention to provide a process which enables the disproportionation of chlorosilanes at a high temperature to produce the disproportionated products of high purity semiconductor grade without any contamination from the catalyst.

This object is attained by using as a catalyst an ion exchange resin of the macroporous type which is capable of withstanding a high temperature and, more specifically, an anion exchange resin of the macroporous type containing as a functional group an aromatic heterocyclic base which is contained in a cross-linking high-molecular matrix.

DETAILED DESCRIPTION OF THE INVENTION

Figure 1:
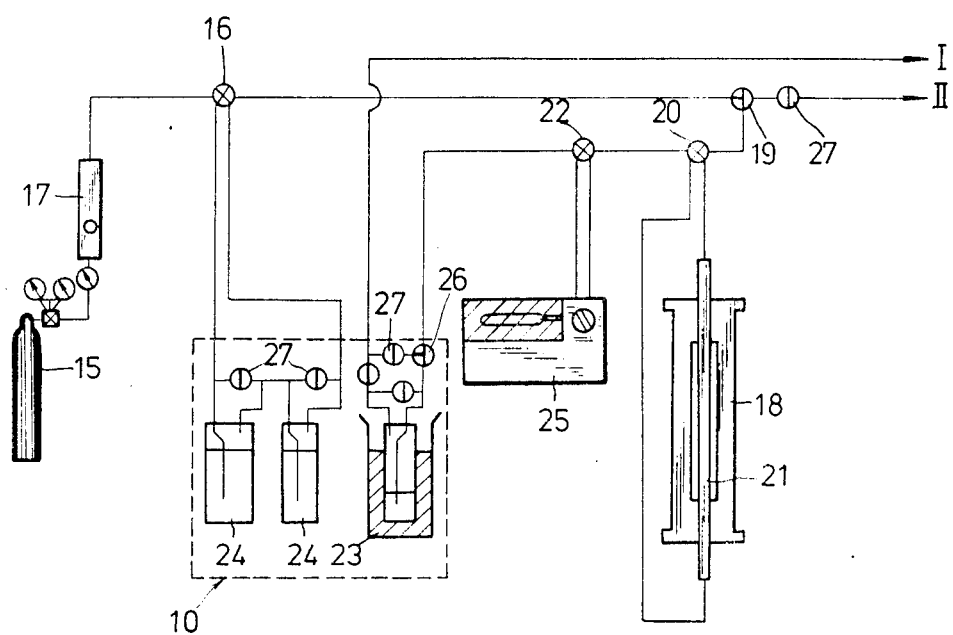
FIG. 1 is a diagrammatic representation of an apparatus which may be employed to carry out the process of this invention.

An ion exchange resin of the macroporous type which contains an aromatic heterocyclic base, for example, pyridine, as a functional group in a cross-linking high molecular matrix provided by divinylbenzene can be used as a catalyst for the disproportionation of chlorosilanes even at a temperature of 100° C. or above to produce the disproportionated product of high purity semiconductor grade without any contamination from the catalyst, since there is no separation of the functional group even at such a temperature. If the disproportionation of trichlorosilane into chlorosilane compounds, including dichlorosilane, monochlorosilane and silicon tetrachloride, is carried out at a temperature of 200° C., for example, it yields a maximum of 13 mole percent of dichlorosilane in the reaction product. This is an extremely high rate of conversion as compared with the maximum of 8 mole percent obtained when an anion exchange resin containing an introduced functional group is used.

An anion exchange resin of the macroporous type containing an aromatic heterocyclic base as a functional group is a high molecular compound of the macropore structure formed by copolymerization from a monounsaturated hydrocarbon containing an aromatic heterocyclic base, such as 4-vinylpyridine, and a polyunsaturated hydrocarbon, such as divinylbenzene. The functional group is, therefore, not separated from the resin unless its cross-linking high molecular matrix is destroyed.

Table 2 shows the properties of a pyridine-basic ion exchange resin as an example of anion exchange resins of the type containing a functional group in the matrix.

TABLE 2

| Exchange group |  N |
|---|---|
| Type | Macroporous type |
| Bulk density (kg/liter) | 0.75 |
| Water content (%) | 32 to 38 |
| Grain size (mesh) | 16 to 50 |
| Exchange capacity (meg/ml) | 4.8 |
| Maximum working temp. (°C.) | 200 |
| Effective pH range | 0 to 7 |
| Percentage of swelling ($OH^-$ to $SO_4^{2-}$, %) | +68% |
| Compressive strength (g/bead) | Above 2500 |
| Specific density | 1.10 |
| Specific surface area (m$^2$/g) | 30 |

As is obvious from Table 2, an anion exchange resin of the macroporous type containing a functional group in the copolymer matrix usually contains 30 to 40% of water. In order to use it as a catalyst for the disproportionation of chlorosilanes, it is necessary to remove or evaporate water therefrom. The removal of water can, for example, be effected by a method which will hereinafter be described. The resin is placed in a constant temperature vacuum drier connected to a vacuum pump through a trap cooled by liquid nitrogen. The vacuum pump is driven to create a vacuum atmosphere in the drier. The resin is gradually heated to 200° C. and maintained at this temperature for 12 hours. No objectionable odor comes out of the exit of the vacuum pump throughout this operation. This confirms that the functional group is not separated from the resin.

By experimentation, it was found that if an anion exchange resin of the type containing an introduced functional group is dehydrated by the high temperature vacuum method as hereinabove described, the exit of the vacuum pump begins to send out the odor of trimethylamine upon arrival of a temperature of 50° C. This odor becomes more objectionable upon arrival of the heating temperature at 100° C. and does not cease to come out even if the resin is heated to 200° C. for a period of 12 hours or longer. The presence of trimethylamine is evidence of the separation of the functional group from the matrix as the temperature increases above 50° C.

The invention will now be described more specifically with reference to the number of examples thereof.

EXAMPLE 1

FIG. 1 shows by way of example a reaction system which can be employed for carrying out this invention.

Argon gas is supplied from an argon bottle 15 to a four-way cock 16 through a flow meter 17 at a rate of 0.926 millimole per minute, while trichlorosilane is supplied from a trichlorosilane reservoir 24 to a four-way cock 16 at a rate of 1.654 millimoles per minute. The resulting mixture of argon and trichlorosilane flows from the four-way cock 16 to reactor 18 through a three-way cock 19 and a four-way cock 20. The reactor 18 includes a stainless steel reaction tube 21 having an inside diameter of 8 mm and wall thickness of 1 mm. The reaction tube is filled with 7.14 g. of the pyridine-basic ion exchange resin which has hereinabove been shown in Table 2 which has been dehydrated in a constant temperature vacuum drier for 12 hours at the temperature of 200° C. The resin forms a catalyst bed having a height of 30.0 cm, a volume of 15.1 ml and a void ($\epsilon$) of 0.67.

The mixed gas was fed to the reaction tube at temperatures of 40°, 60°, 80°, 100°, 150° and 200° C., and kept in contact with the catalyst therein for different periods of time as shown in Table 3 below. The effluent of the reaction tube was supplied to a gas chromatograph 25 through four-way cocks 20 and 22. The disproportionated gas was analyzed by gas chromatography and delivered to a condenser 23 held at a temperature of −60° C. or to a chemical vapor deposition reactor after dilution with hydrogen. After a condensate had been removed therein, the gas was discharged from the condenser 23 through a vent (I). The reaction system 10 includes a plurality of stop cock 27 for operating and maintaining the process.

The gas sampling operation was repeated at least ten times after the entire system including the reaction tube, gas sampling device and piping had reached a stational operating condition. The analysis of the effluent gas was effected by determining the average value of the response peak area of each component in the gas chromatograph according to the half band width method. The results are shown in Table 3.

As is obvious from Table 3, an increase in the reaction temperature brought about an increase in the quantity of each component of the condensate with a reduction in contact time, a decrease in the processing time. These results testify the advantage of this invention that the disporportionation of chlorosilanes at a high temperature provides a high rate of conversion. The processing time is decreased.

EXAMPLE 2

A bottle containing dichlorosilane of 98 percent purity was connected to the flow meter 17 shown in FIG. 1 and dichlorosilane gas was fed to the reactor 18 at a rate of 1.26 millimoles per minute or 2.98 millimoles per minute. The reservoir 24 was not used. The reactor 18 was filled with 6.84 g of the same catalyst as used in Example 1, which formed a catalyst bed having a height of 26.5 cm, a volume of 13.3 ml and a void ($\epsilon$) of 0.67.

The dichlorosilane gas was fed to the reactor tube at temperatures of 40°, 60°, 80°, 100°, 150° and 200° C. and contacted with the catalyst for different periods of time as shown in Table 4. The procedures of Example 1 were repeated for analyzing the effluent of the reaction tube. The results are shown in Table 4.

TABLE 3

| Reaction temp. (°C.) | Total gas flow rate (ml/min.) | Contact time (min.) | Composition of the condensate (mole %) | | | |
|---|---|---|---|---|---|---|
| | | | $SiCl_4$ | $HSiCl_3$ | $H_2SiCl_2$ | $H_3SiCl$ |
| 40 | 63.1 | 0.160 | 3.4 | 94.0 | 2.66 | 0.02 |
| 60 | 67.1 | 0.151 | 6.8 | 87.3 | 5.89 | 0.09 |
| 80 | 71.2 | 0.142 | 10.7 | 81.1 | 8.05 | 0.13 |
| 100* | 75.2 | 0.134 | 12.6 | 78.0 | 9.10 | 0.35 |
| 150 | 85.3 | 0.118 | 13.2 | 74.0 | 12.1 | 0.68 |
| 200 | 95.4 | 0.106 | 14.9 | 71.3 | 13.0 | 0.80 |

*The chemical vapor deposition silicon rod made from the disproportionated gas has the electric resistivity of 300 Ω-cm (N-type).

TABLE 4

| Reaction temp. (°C.) | Feed gas flow rate (ml/min.) | Contact time (min.) | Composition of the effluent gas (mole %) | | | | |
|---|---|---|---|---|---|---|---|
| | | | $SiCl_4$ | $HSiCl_3$ | $H_2SiCl_2$ | $H_3SiCl$ | $H_4Si$ |
| 40 | 31.3 | 0.285 | 0.3 | 41.4 | 34.2 | 8.4 | 15.8 |
| 60 | 33.3 | 0.268 | 0.7 | 37.8 | 35.9 | 10.1 | 15.5 |
| 80 | 35.3 | 0.252 | 0.8 | 39.4 | 34.0 | 10.2 | 15.6 |
| 100 | 87.8 | 0.101 | 0.9 | 38.8 | 34.8 | 10.6 | 14.9 |
| 150 | 99.5 | 0.0896 | 1.2 | 37.9 | 34.9 | 12.8 | 13.2 |
| 200 | 111.5 | 0.0799 | 1.3 | 36.0 | 36.7 | 14.2 | 11.7 |

What I claim is:

1. A process of disporportionation of chlorosilanes in the presence of an anion exchange resin of the macroporous type as a catalyst to produce the disporportionated product of high purity for semiconductor grade silicon, without any contamination from the catalyst comprising the steps of:

providing a water-containing anion exchange cross-linked copolymer resin matrix of the macroporous type by the polymerization of 4-vinylpyridine and divinylbenzene as the catalyst in granular form;

drying the catalyst under vacuum by heating to temperatures up to 200° C.; and passing trichlorosilane over the dried catalyst at elevated temperatures of about 100° C. up to 200° C. to give a yield of dichlorosilane of greater than 10 mole percent.

2. The process as defined in claim 1 wherein said water-containing catalyst is dried by heating under vacuum to a temperature of 200° C. for a period up to 12 hours.

3. the process as defined in claim 1 wherein said trichlorosilane is passed through the reaction system in the presence of argon gas.

* * * * *